(12) United States Patent
Gschwind et al.

(10) Patent No.: US 10,705,841 B2
(45) Date of Patent: *Jul. 7, 2020

(54) INSTRUCTION TO PERFORM A LOGICAL OPERATION ON CONDITIONS AND TO QUANTIZE THE BOOLEAN RESULT OF THAT OPERATION

(71) Applicant: INTERNATIONAL BUSINESS MACHINES CORPORATION, Armonk, NY (US)

(72) Inventors: Michael K. Gschwind, Chappaqua, NY (US); Brett Olsson, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 199 days.

This patent is subject to a terminal disclaimer.

(21) Appl. No.: 14/748,529

(22) Filed: Jun. 24, 2015

(65) Prior Publication Data

US 2016/0378469 A1    Dec. 29, 2016

(51) Int. Cl.
  *G06F 9/30*    (2018.01)
(52) U.S. Cl.
  CPC ...... *G06F 9/30029* (2013.01); *G06F 9/30025* (2013.01); *G06F 9/30072* (2013.01); *G06F 9/30094* (2013.01); *G06F 9/30101* (2013.01)
(58) Field of Classification Search
  CPC ............ G06F 9/30094; G06F 9/30025; G06F 9/30029; G06F 9/30072
  See application file for complete search history.

(56) References Cited

U.S. PATENT DOCUMENTS

| | | |
|---|---|---|
| 5,471,593 A | 11/1995 | Branigin |
| 5,892,697 A | 4/1999 | Brakefield |
| 6,023,751 A | 2/2000 | Schlansker et al. |
| 6,484,253 B1 | 11/2002 | Matsuo |
| 6,912,649 B2 | 6/2005 | Luick |
| 6,944,853 B2 | 9/2005 | Topham |
| 7,191,316 B2 | 3/2007 | Sugumar et al. |
| 7,685,402 B2 | 3/2010 | Garg et al. |
| 7,721,070 B2 | 5/2010 | Nguyen et al. |
| 7,900,025 B2 | 3/2011 | Gschwind |
| 7,908,460 B2 | 3/2011 | Liao et al. |
| 8,041,927 B2 | 10/2011 | Kobayashi |

(Continued)

OTHER PUBLICATIONS

John Hennessy & David Patterson, Computer Architecture A Quantitative Approach, May 15, 2002, third edition, p. 108-109.*

(Continued)

*Primary Examiner* — Benjamin P Geib
*Assistant Examiner* — Courtney P Carmichael-Moody
(74) *Attorney, Agent, or Firm* — Steven Chiu, Esq.; Kevin P. Radigan, Esq.; Heslin Rothenberg Farley & Mesiti P.C.

(57) ABSTRACT

A machine instruction is provided that has associated therewith a result location to be used for a set operation, a first source, a second source, and an operation select field configured to specify a plurality of selectable operations. The machine instruction is executed, which includes obtaining the first source, the second source, and a selected operation, and performing the selected operation on the first source and the second source to obtain a result in one data type. That result is quantized to a value in a different data type, and the value is placed in the result location.

9 Claims, 7 Drawing Sheets

(56) References Cited

U.S. PATENT DOCUMENTS

| | | | |
|---|---|---|---|
| 8,060,545 | B2 | 11/2011 | Lundvall et al. |
| 8,131,661 | B2 | 3/2012 | Ganai |
| 8,650,240 | B2 | 2/2014 | Eichenberger et al. |
| 8,706,795 | B2 | 4/2014 | Lyalin |
| 10,318,291 | B2 | 6/2019 | Ould-Ahmed-Vall et al. |
| 2002/0019928 | A1 | 2/2002 | Saulsbury |
| 2004/0064683 | A1 | 4/2004 | Kalluri |
| 2004/0068642 | A1* | 4/2004 | Tanaka ............... G06F 9/30014 712/223 |
| 2006/0179265 | A1 | 8/2006 | Flood et al. |
| 2007/0234019 | A1 | 10/2007 | Terashima |
| 2008/0177980 | A1 | 7/2008 | Citron |
| 2011/0078415 | A1* | 3/2011 | Johnson ............. G06F 9/30021 712/208 |
| 2013/0246760 | A1 | 9/2013 | Gellerich et al. |
| 2014/0164747 | A1 | 6/2014 | Gschwind et al. |
| 2014/0297991 | A1 | 10/2014 | Corbal et al. |
| 2015/0227371 | A1* | 8/2015 | Sudhakar ............ G06F 9/30058 712/208 |
| 2015/0261529 | A1 | 9/2015 | Gainey, Jr. et al. |
| 2016/0378468 | A1 | 12/2016 | Gschwind et al. |
| 2016/0378474 | A1 | 12/2016 | Gschwind et al. |
| 2016/0378475 | A1 | 12/2016 | Gschwind et al. |
| 2016/0378482 | A1 | 12/2016 | Gschwind et al. |
| 2016/0378485 | A1 | 12/2016 | Gschwind et al. |

OTHER PUBLICATIONS

NVIDIA, PTX: Parallel Thread Execution ISA Version 2.3, Mar. 8, 2011, pp. 102-103.*

"PowerPC User Instruction Set Architecture Book I Version 2.02", Jan. 28, 2005 and pp. 18 and 151-157 (Year: 2005).*

Bryant, Randal E., et al., "CS:APP2e Web Aside ASM:SSE: SSE-Based Support for Floating Point," Aug. 5, 2014, pp. 1-20.

Wharton, John, "Using the Intel MCS®-51 Boolean Processing Capabilities," Apr. 1980, pp. 1-48.

Zhang, Jian, "Specification Analysis and Test Data Generation by Solving Boolean Combinations of Numeric Constraints," First Asian-Pacific Conference on Quality Software, Oct. 2000, pp. 267-274.

"Power ISA™ Version 2.06 Revision B," International Business Machines Corporation, Jul. 23, 2010, pp. 1-1341.

"z/Architecture Principles of Operation," IBM® Publication No. SA22-7832-09, Tenth Edition, Sep. 2012, pp. 1-1568.

Gschwind et al., "Conversion of Boolean Conditions," U.S. Appl. No. 14/748,489, filed Jun. 24, 2015, pp. 1-39.

Gschwind et al., "Efficient Quantization of Compare Results," U.S. Appl. No. 14/748,510, filed Jun. 24, 2015, pp. 1-39.

Gschwind et al., "Conversion of Boolean Conditions," U.S. Appl. No. 14/871,699, filed Sep. 30, 2015, pp. 1-35.

Gschwind et al., "Efficient Quantization of Compare Results," U.S. Appl. No. 14/869,816, filed Sep. 29, 2015, pp. 1-35.

Gschwind et al., "Instruction to Perform a Logical Operation on Conditions and to Quantize the Boolean Result of that Operation," U.S. Appl. No. 14/941,560, filed Nov. 14, 2015, pp. 1-43.

List of IBM Patents or Patent Applications Treated As Related, Mar. 10, 2016, 2 pages.

Office Action for U.S. Appl. No. 14/748,510 dated May 5, 2017, pp. 1-19.

Office Action for U.S. Appl. No. 14/869,816 dated May 10, 2017, pp. 1-20.

Office Action for U.S. Appl. No. 14/748,489 dated May 19, 2017, pp. 1-23.

Office Action for U.S. Appl. No. 14/871,699 dated Jul. 24, 2017, pp. 1-16.

Office Action for U.S. Appl. No. 14/941,560 dated Jul. 31, 2017, pp. 1-25.

Mark McDermott, "The ARM Instruction Set Architecture", Aug. 22, 2008, pp. 17-19.

* cited by examiner

CMP BF, L, RA, RB

SET BOOLEAN
SETB        TT, RT, BA, BB

SET BOOLEAN FLOAT
FSETB

INSTRUCTION TO PERFORM A LOGICAL OPERATION ON CONDITIONS AND TO QUANTIZE THE BOOLEAN RESULT OF THAT OPERATION

BACKGROUND

One or more aspects relate, in general, to processing within a computing environment, and in particular, to Boolean processing within the computing environment.

Many programming languages, which are used to create applications that perform functions within a computing environment, support Boolean expressions, such as expression=(a<b). However, hardware structures to implement Boolean expressions are inadequate. For instance, hardware supports condition registers, flags or predicates, but programming languages support byte, halfword, word or doubleword integer formats. Therefore, compilers are used to convert the result of comparisons, or sometimes more complex logical expressions contained in flags, condition fields or predicate fields, into integer words.

For instance, to convert an expression such as expression=(a<b) into an integer result, traditionally a sequence of instructions is used such as:

| | |
|---|---|
| cmpw ra, rb | (compare register a and register b) |
| li r5, 0 | (load immediate register 5 with 0) |
| bge next | (branch on greater than or equal to Next) |
| li r5, 1 | (load immediate register 5 with one) |

Next:

Disadvantageously, this involves an expensive, hard to predict branch. Thus, one or more techniques have been used to address this problem. For example, automatic predication has been used which converts the conditional branch into a select instruction, as follows:

| | |
|---|---|
| cmpw ra, rb | (compare register a and register b) |
| li r5, 0 | (load immediate register 5 with 0) |
| li eR, 1 | (load immediate 1) |
| isel<ge> R5, eR, r5 | (integer select on greater than or equal - select between two registers based on condition in condition register) |

Other prior embodiments may also use a conditional move instruction. These embodiments which use select and/or conditional move instructions use an inordinate number of (e.g., more than two) instructions and/or registers to provide an integer result.

Further, additional prior embodiments may use load conditional immediate instructions, such as:

| | |
|---|---|
| cmp ra, rb | (compare register a and register b) |
| lhi r5, 0 | (load immediate 0 in register 5) |
| lci r5, 1 | (load conditional immediate - if condition true, load 1 in register 5) |

However, this embodiment is unnecessarily expensive, by requiring the encoding of immediate numbers, and introducing dependencies between multiple instructions.

The deficiencies described above are further exacerbated when logical operations are to be performed on multiple condition results.

SUMMARY

Based on the foregoing, a need exists for an efficient mechanism to convert Boolean conditions (e.g., represented as binary values) into, for instance, integer results to improve processing within a computing environment, thereby improving performance of the computing environment. A further need exists for a capability to perform logical operations on a plurality of condition results, and simultaneously (i.e., with the same instruction) quantize the result (e.g., provide an integer, floating point or other data type result).

Shortcomings of the prior art are overcome and additional advantages are provided through the provision of a computer program product for executing a machine instruction. The computer program product includes a storage medium readable by a processing circuit and storing instructions for execution by the processing circuit for performing a method. The method includes, for instance, obtaining, by a processor, a machine instruction to perform a set operation. The machine instruction having associated therewith, for instance, a result location to be used for the set operation, a first source, a second source, and an operation select field configured to specify a plurality of selectable operations. The machine instruction is executed by the processor, and the executing includes obtaining the first source and the second source. It further includes obtaining from the operation select field an operation to be performed on the first source and the second source, the operation being one operation of the plurality of selectable operations for which the operation select field is configured. The operation is performed on the first source and the second source to obtain a result, the result being a Boolean result represented as one data type. The result in the one data type is quantized to a value in a selected data type different from the one data type, and the value is placed in the result location. Thus, the machine instruction, as a single instruction, performs the operation on multiple sources to obtain the result in the one data type, quantizes the result of the one data type and provides the value of the selected data type.

Advantageously, this embodiment enables a single instruction to provide a value of a selected data type (e.g., integer, floating point, decimal floating point, etc.) for multiple Boolean conditions. It is less complex and less costly than other techniques.

In one example, the machine instruction includes a first source field to be used to obtain the first source and a second source field to be used to obtain the second source. The first source field is used to specify a component (e.g., bit) in a first selected field of a condition register, and the second source field is used to specify a component (e.g., bit) in a second selected field of the condition register. The first source field may include a first value and the second source field may include a second value. The obtaining the first source includes, for example, adding a first constant to the first value to locate the bit in the first selected field of the first condition register to obtain the first source, and the obtaining the second source includes adding a second constant to the second value to locate the bit in the second selected field of the condition register to obtain the second source. The first constant and the second constant may be the same constant or different constants.

As embodiments, the first selected field of the condition register and the second selected field of the condition register are the same field of the condition register or different fields of the condition register.

Advantageously, the first source field specifies one of: a bit in a location in memory, a bit in a field in a program status word, a bit in a flag field, a field in a condition register, or a value used to locate a bit in a field in a condition register. Similarly, the second source field specifies one of: a bit in a location in memory, a bit in a field in a program status word, a bit in a flag field, a bit in a field in a condition register or a value used to locate a bit in a field in a condition register.

In one example, the quantizing the result includes setting the value to a first selected value of the selected data type based on the result of performing the operation comprising one value, and setting the value to a second selected value of the selected data type based on the result of performing the operation comprising another value. This advantageously provides a quantized value of a selected data type for a result (of, e.g., an operation on outputs of one or more previously executed instructions) of a different data type.

The selected data type may be one of integer, floating point, decimal floating point, or binary coded decimal. Further, the plurality of selectable operations includes one or more of: NOT AND, OR with Complement, OR, NOT OR, AND with Complement, AND, XOR, and Equivalence.

In one example, the placing the value in the result location includes storing the value in a register specified by a result field of the machine instruction, in which the register corresponds to the selected data type.

In yet another example, the first source is a first result of a first previously executed instruction and the second source is a second result of a second previously executed instruction.

Methods and systems relating to one or more aspects, as well as other computer program products, are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing, as well as features and advantages of one or more aspects, are apparent from the following detailed description taken in conjunction with the accompanying drawings in which:

DETAILED DESCRIPTION

Figure 1:
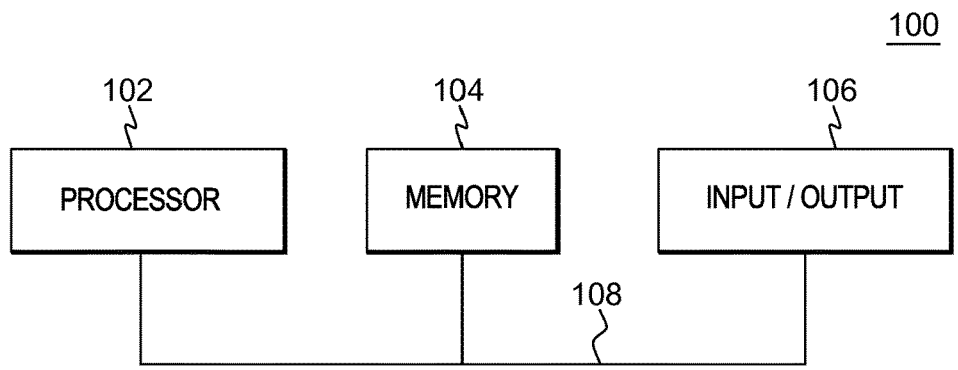
FIG. 1 depicts one example of a computing environment to incorporate and use one or more aspects.

In accordance with one or more aspects, a capability is provided to efficiently perform a logical operation (e.g., Boolean function) on one or more conditions (e.g., of one or more condition registers) and, based on a result of the operation, set a value in a register of a selected data type, such as integer, floating point, binary coded decimal, decimal floating point, etc. As one particular embodiment, an instruction is provided to perform a logical operation on multiple conditions to provide a Boolean result of one data type (e.g., binary), and to quantize that result into a value of a selected data type different from the one data type, such as integer, floating point, binary coded decimal, decimal floating point, a string, etc.

The instruction has associated therewith (e.g., includes) a field configured to specify a plurality of selectable logical operations that may be performed on a plurality of conditions within one or more fields of a condition register, other registers, memory locations, etc. A selected operation is performed on the plurality of conditions and the result is quantized into a value of a selected data type. Thus, a single instruction is configured to perform a number of logical operations, in which one of those operations is performed on a plurality of conditions to provide a result of one data type, quantize that result to a value and place that quantized value in a register corresponding to the selected data type. In one example, the logical operation is a Boolean function that provides a binary result that is quantized to an integer value and stored in an integer register. In another example, the result is quantized to a floating point value and stored in a floating point register. In yet other examples, the result is quantized as a decimal floating point (DFP) value, a binary coded decimal (BCD) value, or a string, etc. and the quantized value is stored in the appropriate register or memory.

In each example, a single instruction performs a logical operation on multiple conditions, obtains a result from that operation, and quantizes the result to a value to be stored in a result location, e.g., a register specified in a result field of the machine instruction. The result is, for instance, a Boolean result (e.g., a binary result) representing true or false, which is then quantized into a value of a selected data type (e.g., a non-binary data type). As examples, the quantized value is an integer 1 for true or an integer 0 for false; a +1.0 in floating point for true, a −1.0 in floating point for false, or any other values in selected data types representing true or false.

One or more aspects are directed to improving computer processing, including performance, by providing a capability that efficiently and less expensively converts Boolean results. Processing within the computer is facilitated by eliminating hard to predict branches, and/or reducing the number of instructions and/or registers used to perform conversion of Boolean results.

One embodiment of a computing environment to incorporate and use one or more aspects is described with reference to FIG. 1. A computing environment 100 includes, for instance, a processor 102 (e.g., a central processing unit), a memory 104 (e.g., main memory), and one or more input/output (I/O) devices and/or interfaces 106 coupled to one another via, for example, one or more buses 108 and/or other connections.

In one embodiment, processor 102 is based on the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE® is a registered trademark of International Business Machines Corporation, Armonk, N.Y., USA. Other names used herein may be registered trademarks, trademarks, or product names of International Business Machines Corporation or other companies.

In another example, processor 102 is based on the z/Architecture offered by International Business Machines Corporation, and is part of a server, such as the System z server, which implements the z/Architecture and is also offered by International Business Machines Corporation. One embodiment of the z/Architecture is described in an IBM® publication entitled, "z/Architecture Principles of Operation," IBM® Publication No. SA22-7832-10, Eleventh Edition, March 2015, which is hereby incorporated herein by reference in its entirety. In one example, the processor executes an operating system, such as z/OS, also offered by International Business Machines Corporation. IBM®, Z/ARCHITECTURE® and Z/OS® are registered trademarks of International Business Machines Corporation.

In yet a further embodiment, processor 102 is based on an Intel architecture offered by Intel Corporation. Intel® is a registered trademark of Intel Corporation, Santa Clara, Calif. Yet further, processor 102 may be based on other architectures. The architectures mentioned herein are merely provided as examples.

Figure 2A:
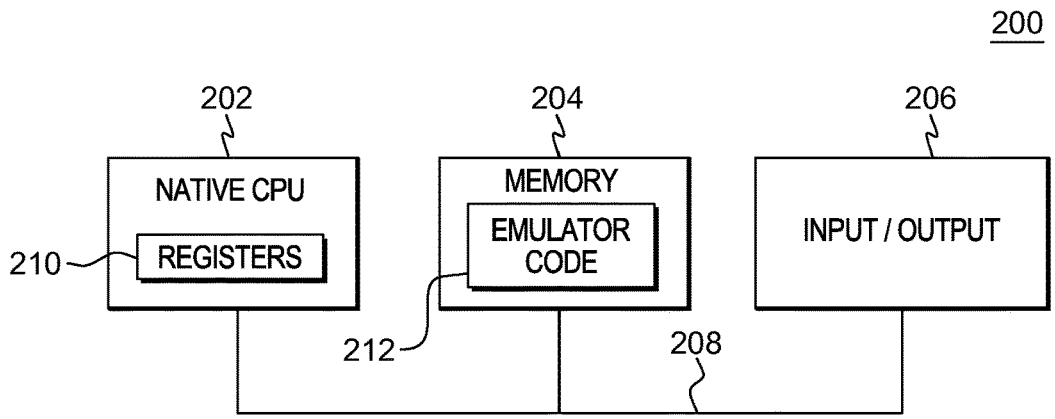
FIG. 2A depicts another example of a computing environment to incorporate and use one or more aspects.

Another embodiment of a computing environment to incorporate and use one or more aspects is described with reference to FIG. 2A. In this example, a computing environment 200 includes, for instance, a native central processing unit 202, a memory 204, and one or more input/output devices and/or interfaces 206 coupled to one another via, for example, one or more buses 208 and/or other connections. As examples, computing environment 200 may include a PowerPC processor, a zSeries server, or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represent the state of the environment at any particular point in time.

Moreover, native central processing unit 202 executes instructions and code that are stored in memory 204. In one particular example, the central processing unit executes emulator code 212 stored in memory 204. This code enables the processing environment configured in one architecture to emulate another architecture. For instance, emulator code 212 allows machines based on architectures other than the Power architecture, such as zSeries servers, pSeries servers, HP Superdome servers or others, to emulate the Power architecture and to execute software and instructions developed based on the Power architecture. In a further example, emulator code 212 allows machines based on architectures other than the z/Architecture, such as PowerPC processors, pSeries servers, HP Superdome servers or others, to emulate the z/Architecture and to execute software and instructions developed based on the z/Architecture. Other architectures may also be emulated.

Figure 2B:
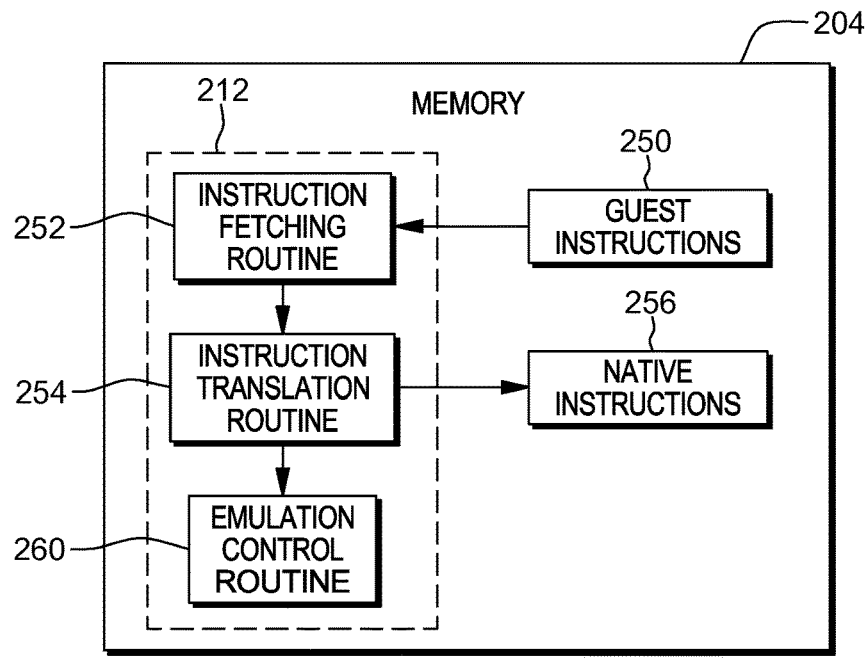
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a PowerPC processor or a z/Architecture processor 102, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, a guest instruction 250 that is obtained, translated and executed is an instruction described herein. The instruction, which is of one architecture (e.g., the Power architecture or z/Architecture) is fetched from memory, translated and represented as a sequence of native instructions 256 of another architecture (e.g., the z/Architecture, Power architecture, Intel architecture, etc.). These native instructions are then executed.

Figure 3A:
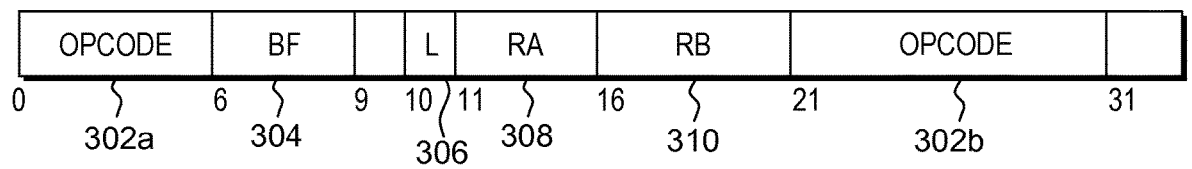
FIG. 3A depicts one example of a compare instruction.

One instruction used in accordance with one or more aspects is a compare instruction used to compare data in two registers. One implementation of a compare instruction is described with reference to FIG. 3A. In one example, a Compare (CMP) instruction 300 includes operation code (opcode) fields 302a (e.g., bits 0-5), 302b (e.g., bits 21-30) indicating a compare operation; a first field (BF) 304 (e.g., bits 6-8) used to indicate a field in a condition register; a second field (L) 306 (e.g., bit 10) used to indicate whether operands are treated as 32-bit operands (L=0) or 64-bit operands (L=1); a third field (RA) 308 (bits 11-15) used to designate a first register to be compared; and a fourth field (RB) 310 (e.g., bits 16-20) used to designate a second register to be compared with the first register. Each of the fields 304-310, in one example, is separate and independent from one another; however, in other embodiments, more than one field may be combined. Further information on the use of the fields is provided below.

In operation, the contents of register RA (bits 32:63, if L=0, and bits 0:63, if L=1) are compared with the contents of register RB (bits 32:63, if L=0, and bits 0:63, if L=1), treating the operands as signed integers. The result of the comparison is placed into the condition register in the field designated by BF. As examples, if the contents of register RA are less than the contents of register RB, the result is 1000(b-binary); if greater than, the result is 0100(b); and if equal, the result is 0010(b). This result is placed in the condition register in the selected field designated by BF.

Figure 3B:
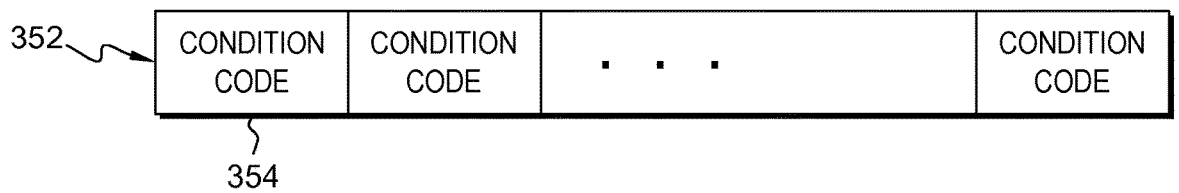
FIG. 3B depicts one example of a condition register.

In particular, as depicted in FIG. 3B, the condition register 350 includes a plurality of fields 352, and each field includes a condition code 354. The condition code is, for instance, four bits, and each bit represents a particular predicate or condition, such as the leftmost bit represents less than, next leftmost bit represents greater than, the next leftmost bit represents equal, and the rightmost bit represents another condition, such as an unordered flag for floating point, etc. The BF field indicates which field in the condition register is to receive the result of the comparison (i.e., which condition code is to be set).

Thus, in one embodiment, the compare instruction compares the contents of the two registers, and places a result of the comparison in a selected field (or condition code) within the condition register. The selected field has a plurality of bits, and each bit represents a particular condition. The setting of a particular bit represents the associated condition. After setting the selected field using, for instance, a compare instruction or another instruction, the selected field of the condition register may be tested and a Boolean condition may be set, as described herein.

Although in various examples herein, the selected field is one of a plurality of fields in a condition register selected by a field of an instruction, in other embodiments, there is only one field to be selected (such as in a program status word or a flag), and therefore, there is no BF field. The result is just placed in the one field designated to receive the results of the comparison.

Further, in one or more embodiments, multiple comparisons or similar type operations may be performed setting multiple conditions in the same condition register field or in a plurality of condition register fields. Then, one or more logical operations may be performed on the multiple conditions providing a Boolean result in one data type, such as binary. The Boolean result is then quantized to a selected data type different from the one data type (e.g., integer, floating point, decimal floating point, binary coded decimal, etc.), as described herein.

In other embodiments, there may be multiple condition registers and the logical operation is performed on condition codes of the multiple condition registers.

Figure 4A:
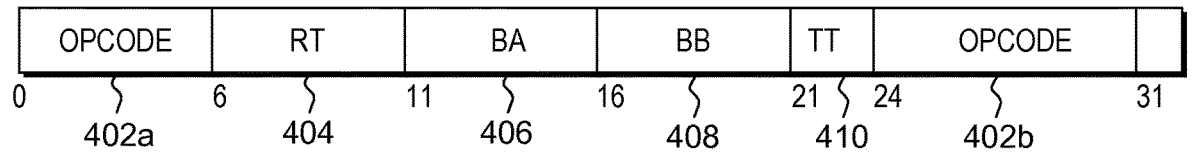
FIG. 4A depicts one example of a Set Boolean instruction, in accordance with one or more aspects.

One example of an instruction to compute a Boolean function on a predicate (e.g., condition) register to provide a Boolean result, which is quantized to a particular value of a selected data type (e.g., an integer result of 1 for a true condition, or 0 for a false condition) is described with reference to FIG. 4A. In one example implementation in the Power Architecture, a Set Boolean (Setb) instruction 400 includes, for instance, opcode fields 402a (e.g., bits 0-5), 402b (e.g., bits 24-30) indicating a set Boolean operation; a result field 404 (e.g., bits 6-10) used to designate a general purpose register (GPR) to hold the result (RT) of the set Boolean operation; a first source field (BA) 406 (e.g., bits 11-15) used to identify a component (e.g., bit) in a first selected field of the condition register (source 1); a second source field (BB) 408 (e.g., bits 16-20) used to identify a component (e.g., bit) in a second selected field of the condition register (source 2); and an operation select field (TT) 410 (e.g., bits 21-23) used to indicate one of a plurality of logical operations to be performed. Each of the fields 404-410, in one example, is separate and independent from one another; however, in other embodiments, more than one field may be combined. Further information on the use of the fields is provided below.

In operation, if the result of performing the logical operation specified by TT on source 1 and source 2 is true, 0x0000_0000_0000_0001 (in the example of an integer data type) is placed into a result location (e.g., the register specified by the result field). Otherwise, 0x0000_0000_0000_0000 is placed into the result location (e.g., the register specified by the result field). As examples, source 1 is the content of a selected bit of a first selected condition register field (e.g., BA+32), and source 2 is the content of a selected bit of a second selected condition register field (BB+32), in which the first selected condition register field and the second condition register field are the same condition register field or different condition register fields. In this example, the number 32 is added to BA and BB, since the numbering of the condition register bits begins at 32; however, in another embodiment, if the numbering began at zero, this would not be needed. Similarly, if the numbering began at a different number, the different number would be added.

As examples, the result location may be a register specified by a result field of an instruction; an implied register of an instruction; a memory location; a field of an instruction, etc. Many examples exist.

Example logical functions that may be specified by TT include:

| TT | FUNCTION | ABBREVIATION |
| --- | --- | --- |
| 0b000 | NOT AND | nand |
| 0b001 | OR with Complement | orc |
| 0b010 | OR | or |
| 0b011 | NOT OR | nor |
| 0b100 | AND with Complement | andc |
| 0b101 | AND | and |
| 0b110 | Exclusive OR | xor |
| 0b111 | Equivalence | eqv |

Example cases using the above logical functions are provided below:
Case 0b000: GPR[RT]=EXTZ64 (~CR.bit[BA]|~CR.bit.[BB]) // nand
Case 0b001: GPR[RT]=EXTZ64 (CR.bit[BA]|~CR.bit.[BB]) // norc
Case 0b010: GPR[RT]=EXTZ64 (CR.bit[BA]|CR.bit.[BB]) // or
Case 0b011: GPR[RT]=EXTZ64 (~CR.bit[BA] & ~CR.bit.[BB]) // nor
Case 0b100: GPR[RT]=EXTZ64 (CR.bit[BA]|~CR.bit.[BB]) // andc Case 0b101: GPR[RT]=EXTZ64 (CR.bit[BA] & CR.bit.[BB]) // and Case 0b110: GPR[RT]=EXTZ64 (CR.bit[BA] ^ CR.bit.[BB]) // xor Case 0b111: GPR[RT]=EXTZ64 (CR.bit[BA] ^ ~CR.bit.[BB]) // eqv Where EXTZ64 refers to extend zero 64; ~ is NOT or complement; | is OR; and & is AND.

Although examples of logical operations are provided herein, more, less or different logical operations may be specified in other embodiments.

Figure 4B:
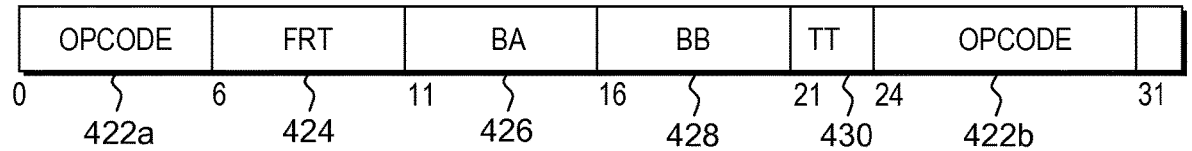
FIG. 4B depicts one example of a Set Boolean Float instruction, in accordance with one or more aspects.

Another example of an instruction to compute a Boolean function on a predicate (e.g., condition) register to provide a Boolean result of one data type, which is quantized to a particular value of a selected data type (e.g., a floating point value of +1.0 for a true condition, or −1.0 for a false condition) is described with reference to FIG. 4B. In this example, the result is quantized as a floating point value, and therefore, the instruction is a Set Boolean Float instruction. In one example implementation in the Power Architecture, a Set Boolean Float (fsetb) instruction 420 includes, for instance, opcode fields 422*a* (e.g., bits 0-5), 422*b* (e.g., bits 24-30) indicating a set Boolean float operation; a result field 424 (e.g., bits 6-10) used to designate a floating point register (FPR) to hold the result (FRT) of the set Boolean float operation; a first source field (BA) 426 (e.g., bits 11-15) used to identify a component (e.g., bit) of a first selected field of the condition register (source 1); a second source field (BB) 428 (e.g., bits 16-20) used to identify a component (e.g., bit) of a second selected field of the condition register (source 2); and an operation select field (TT) 430 (e.g., bits 21-23) used to indicate one of a plurality of logical functions to be performed. Each of the fields 424-430, in one example, is separate and independent from one another; however, in other embodiments, more than one field may be combined.

In operation of this instruction, if the result of performing the logical function specified by TT on source 1 and source 2 is true, +1.0 is placed into a result location (e.g., the register specified by the result field) in double precision format. Otherwise, −1.0 is placed into the result location (e.g., the register specified by the result field) in double precision format. As examples, source 1 is the content of a selected bit of a first selected field of the condition register (e.g., BA+32), and source 2 is the content of a selected bit of a second selected field of the condition register (BB+32), in which the first field of the condition register and the second field of the condition register are the same condition register field or different condition register fields. In this example, the number 32 is added to BA and BB, since the numbering of the condition register bits begins at 32; however, in another embodiment, if the numbering began at zero, this would not be needed. Similarly, if the numbering began at a different number, the different number would be added.

Figure 4C:
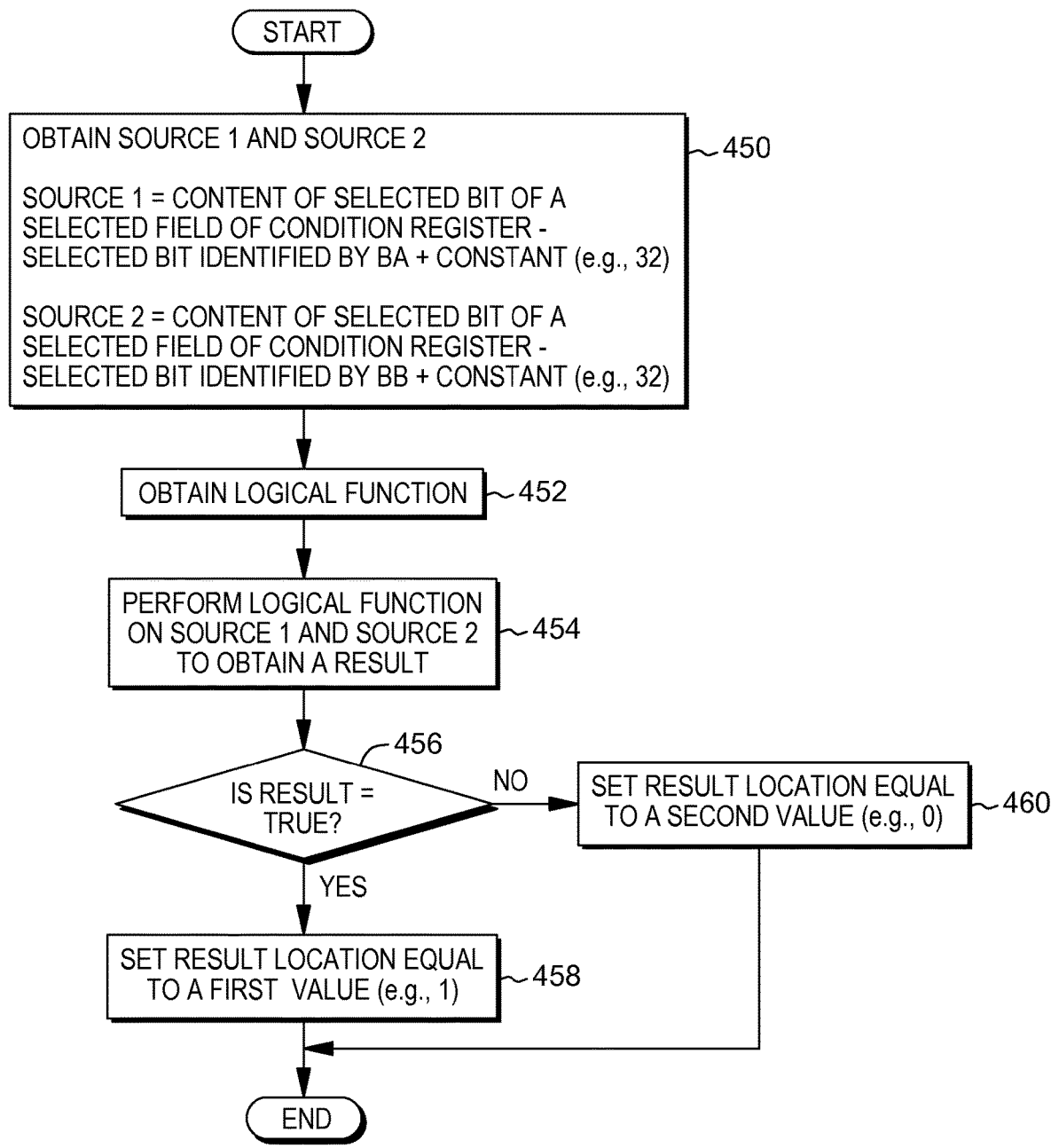
FIG. 4C depicts one embodiment of logic associated with the Set Boolean instruction of FIG. 4A and/or FIG. 4B, in accordance with one or more aspects.

One embodiment of logic associated with the Set Boolean (and similarly the Set Boolean Float) instruction is described with reference to FIG. 4C. Initially, source 1 and source 2 are obtained, STEP 450. In one example, source 1 is equal to the content of a bit of a first selected field of the condition register, and source 2 is equal to the content of a bit of a second selected field of the condition register. The bit of the first selected field is identified by BA plus a constant (e.g., 32) in this particular example, and the bit of the second selected field is identified by BB plus a constant (e.g., 32) in this particular example. In other examples, a constant may not be needed at all, or may be a value different than 32 depending on the numbering of the condition register bits. In one example, the first selected field and the second selected field are the same field. Further, in another example, there may be multiple condition register fields and one bit is selected from one condition register field and another bit is selected from another condition register field. In yet other embodiments, components of sizes other than bit may be selected. Still further, there may be multiple condition registers from which bits or other components are selected. Many other variations are possible.

In addition to obtaining source 1 and source 2, the logical operation to be performed on source 1 and source 2 is obtained, e.g., from the instruction, STEP 452. For instance, the logical operation is obtained from the TT field of the instruction, which is configurable to specify one or more selectable logical operations. In other embodiments, the logical operation to be performed may be obtained from an implied register or memory location associated with the instruction or by other means.

Subsequent to obtaining the source operands and the logical function, the logical function is performed on the source operands to produce a result, e.g., a Boolean result of one data type (e.g., binary), STEP 454. Thereafter, a determination is made as to whether the result produced from performing the logical function is true (e.g., =1) or false (e.g., =0), INQUIRY 456. If the result is true, then the result location (e.g., the register specified in the result field) is set to one value (e.g., 1) represented in the selected data type (e.g., 0x0000_0000_0000_0001 for integer, or +1.0 for floating point, as examples), STEP 458; otherwise, the result location (e.g., the register specified in the result field) is set to another value (e.g., 0) represented in the selected data type (e.g., 0x0000_0000_0000_0000 for integer, or −1.0 for floating point, as examples), STEP 460.

Again, other operations and/or conditions may be represented. As used herein, the terms "logical operation" and "logical function" are used interchangeably.

Figure 5:
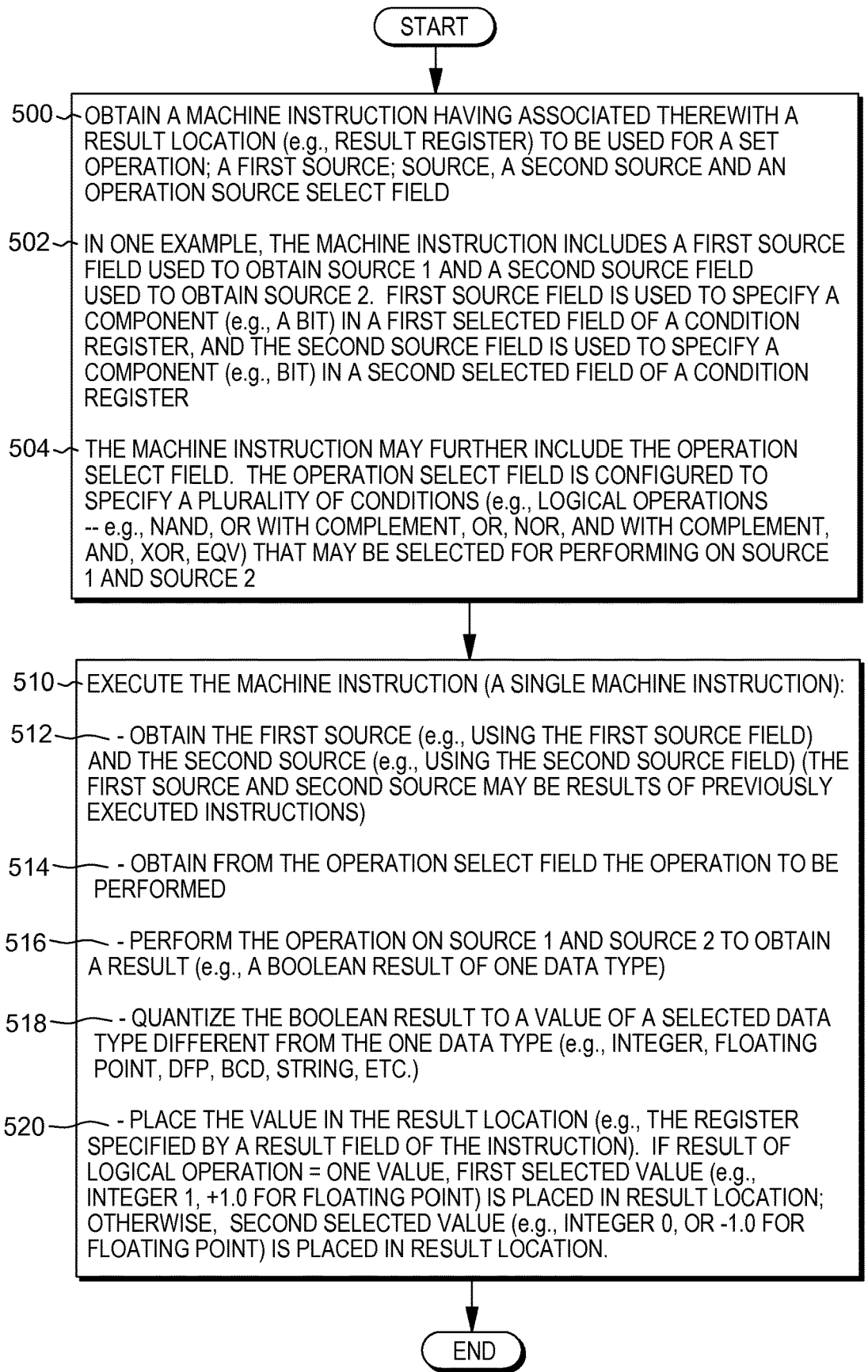
FIG. 5 depicts logic to obtain and execute an instruction to set a Boolean result as a quantized value, in accordance with one or more aspects.

As described herein, in one embodiment and with reference to FIG. 5, a machine instruction (e.g., Setb) is obtained, and the machine instruction has associated therewith a result location to be used for a set operation, a first source (Source 1), a second source (Source 2) and an operation select field, STEP 500. In one particular embodiment, the machine instruction includes, a first source field to be used to obtain the first source, a second source field to be used to obtain the second source, STEP 502, and the operation select field to be used to obtain an operation to be performed on the first source and the second source, STEP 504.

The machine instruction is executed, STEP 510. The executing includes, for instance, obtaining the first source (e.g., using the first source field) and the second source (e.g., using the second source field), STEP 512. Further, it includes obtaining from the operation select field the operation to be performed on the first source and the second source, STEP 514. The operation may be a logical operation, such as NAND, OR Complement, OR, NOR, AND Complement, AND, XOR and EQV, as examples.

The logical operation is performed on the first source and the second source to obtain a result, STEP 516. The result may be, for instance, one value in one data type (e.g., binary 1) indicating a result of true, or another value in the one data type (e.g., binary 0) indicating a result of false. The result is quantized to a value of a selected data type (e.g., a non-binary data type, such as integer, floating point, decimal floating point (DFP), binary coded decimal (BCD), string, etc.), STEP 518, and the value in the selected data type is placed in the result location (e.g., the general purpose register specified by a result field of the instruction), STEP 520. For instance, if the result of the logical operation is the one value, then a first selected value (e.g., integer one, or +1.0 for floating point) is placed in the result location; otherwise, a second selected value (e.g., integer zero, or −1.0 for floating point) is placed in the result location.

A capability is provided for using a single hardware machine instruction (e.g., an architected instruction of a selected architecture having an architected opcode in which only a single pass through the processor pipeline is used) to produce a Boolean result in one data type, such as binary, and quantize that result into a selected data type of one or more data types different from the one data type (e.g., integer, floating point, decimal floating point, binary coded decimal, etc.). This includes interpreting the state of one or more status flags in one or more condition status registers set by one or more previous instructions, such as compare instructions or other instructions that provide similar types of results. In one particular example, a single Set Boolean instruction is able to perform logical operations on a plurality of condition results to process complex conditions and simultaneously (i.e., with the same single instruction) quantize the result to produce a value of a selected data type.

One or more aspects enable compilers and/or programmers to quantize a single conditional flag to produce a Boolean result; quantize the result of any of the basic logical operations (e.g., AND, OR, XOR, NAND, etc) on any pair of conditional flags from a comparison; or quantize the result of any of the basic logical operations on any pair of conditional flags from a pair of independent comparisons.

Example implementations provide various forms of an instruction to perform the above, including, but not limited, to an instruction that produces a 64-bit integer result of 0 or 1; and an instruction that produces a floating point result of +1.0 and −1.0. The floating point instruction may, in one embodiment, be used in conjunction with a floating point select operation that selects between two floating point values based on the sign of a third floating point value.

In addition or instead of integer and/or floating point, other instruction formats are possible for other types of data.

Although an example of the instruction is provided for the Power Architecture, one or more aspects are equally applicable to other architectures, including but not limited to, the z/Architecture and the Intel architecture. Other variations are also possible.

One or more aspects enable the extraction of Boolean state such that complex logical conditions can be generated without branch code, without the use of an inordinate number of (e.g., more than two) instructions and/or registers, and without introducing dependencies between multiple instructions. This allows less expensive and easier code to execute. It also is beneficial for those Instruction Set Architectures (ISAs) that do not support greater than two operands. Overall, one or more aspects improve processor performance.

As described herein, in one or more aspects, a machine instruction to perform a set operation is obtained by a processor. The machine instruction has associated therewith a result location to be used for the set operation, a first source, a second source, and an operation select field configured to specify a plurality of selectable operations. The machine instruction is executed, and the executing includes obtaining the first source and the second source; obtaining from the operation select field an operation to be performed on the first source and the second source, the operation being one operation of the plurality of selectable operations for which the operation select field is configured; performing the operation on the first source and the second source to obtain a result, the result being a Boolean result represented as one data type; quantizing the result in the one data type to a value of a selected data type different from the one data type; and placing the value in the result location, wherein the machine instruction, as a single machine instruction, performs the operation on multiple sources to obtain the result of the one data type, quantizes the result of the one data type and provides the value of the selected data type.

Advantageously, this embodiment enables a single instruction (e.g., a single hardware instruction having an architected opcode) to provide a value of a selected data type (e.g., integer, floating point, decimal floating point, etc.) for multiple Boolean conditions. It is less complex and less costly than other techniques.

In one embodiment, the quantizing the result includes setting the value to a first selected value of the selected data type based on the result of performing the operation comprising one value, and setting the value to a second selected value of the selected data type based on the result of performing the operation comprising another value. This advantageously provides a quantized value of a selected data type for a result (of, e.g., an operation on outputs of one or more previously executed instructions) of a different data type.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 6:
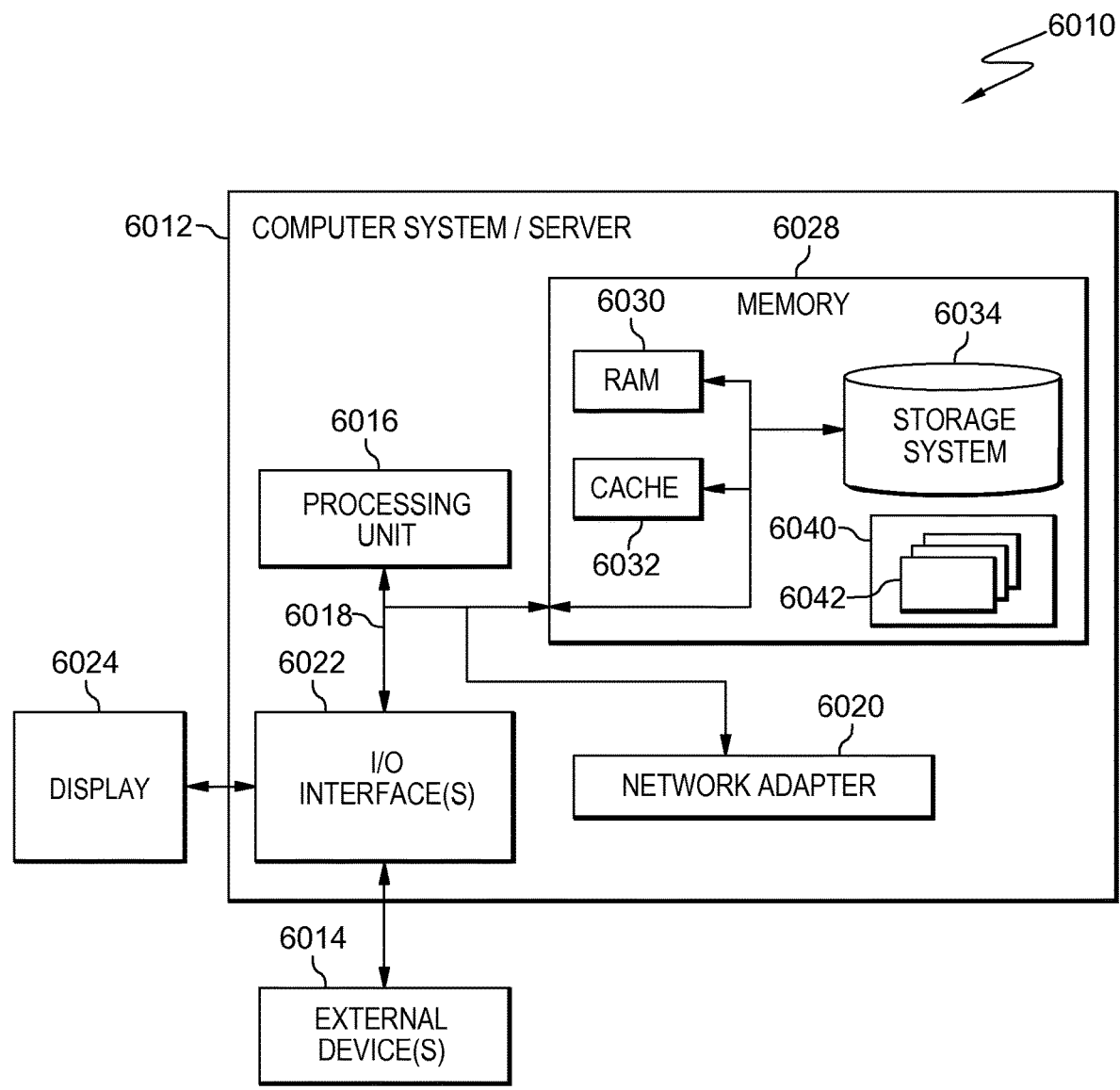
FIG. 6 depicts one example of a cloud computing node, in accordance with one or more aspects.

Referring now to FIG. 6, a schematic of an example of a cloud computing node is shown. Cloud computing node 6010 is only one example of a suitable cloud computing node and is not intended to suggest any limitation as to the scope of use or functionality of embodiments of the invention described herein. Regardless, cloud computing node 6010 is capable of being implemented and/or performing any of the functionality set forth hereinabove.

In cloud computing node 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 6012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 6012 in cloud computing node 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

Figure 7:
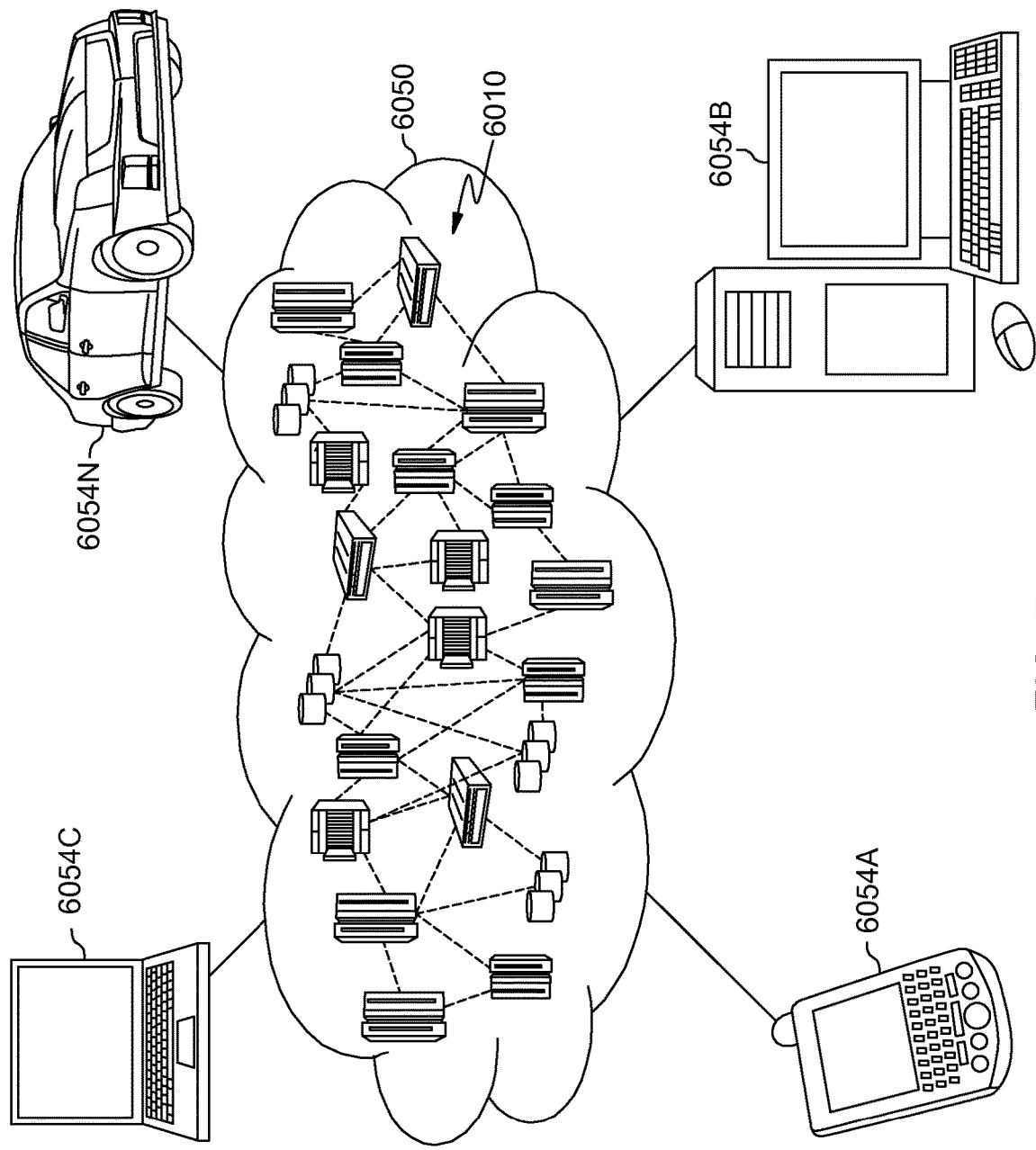
FIG. 7 depicts one embodiment of a cloud computing environment, in accordance with one or more aspects.

Referring now to FIG. 7, illustrative cloud computing environment 6050 is depicted. As shown, cloud computing environment 6050 comprises one or more cloud computing nodes 6010 with which local computing devices used by cloud consumers, such as, for example, personal digital assistant (PDA) or cellular telephone 6054A, desktop computer 6054B, laptop computer 6054C, and/or automobile computer system 6054N may communicate. Nodes 6010 may communicate with one another. They may be grouped (not shown) physically or virtually, in one or more networks, such as Private, Community, Public, or Hybrid clouds as described hereinabove, or a combination thereof. This allows cloud computing environment 6050 to offer infrastructure, platforms and/or software as services for which a cloud consumer does not need to maintain resources on a local computing device. It is understood that the types of computing devices 6054A-N shown in FIG. 7 are intended to be illustrative only and that computing nodes 6010 and cloud computing environment 6050 can communicate with any type of computerized device over any type of network and/or network addressable connection (e.g., using a web browser).

Figure 8:
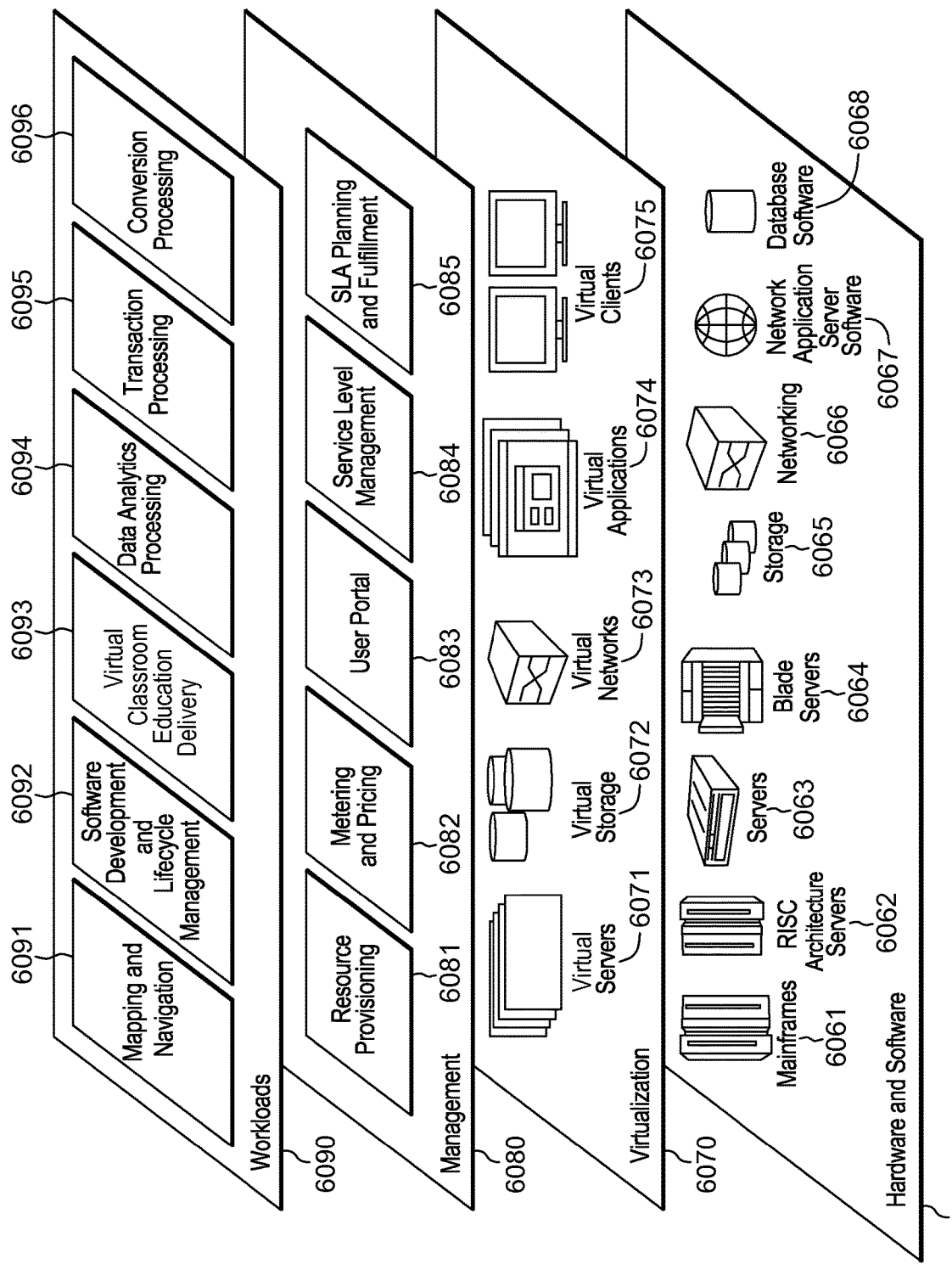
FIG. 8 depicts one example of abstraction model layers, in accordance with one or more aspects.

Referring now to FIG. 8, a set of functional abstraction layers provided by cloud computing environment 6050 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 6060 includes hardware and software components. Examples of hardware components include mainframes 6061; RISC (Reduced Instruction Set Computer) architecture based servers 6062; servers 6063; blade servers 6064; storage devices 6065; networks and networking components 6066. In some embodiments, software components include network application server software 6067 and database software 6068.

Virtualization layer 6070 provides an abstraction layer from which the following examples of virtual entities may be provided: virtual servers 6071; virtual storage 6072; virtual networks 6073, including virtual private networks; virtual applications and operating systems 6074; and virtual clients 6075.

In one example, management layer 6080 may provide the functions described below. Resource provisioning 6081 provides dynamic procurement of computing resources and other resources that are utilized to perform tasks within the cloud computing environment. Metering and Pricing 6082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 6083 provides access to the cloud computing environment for consumers and system administrators. Service level management 6084 provides cloud computing resource allocation and management such that required service levels are met. Service Level Agreement (SLA) planning and fulfillment 6085 provide pre-arrangement for, and procurement of, cloud computing resources for which a future requirement is anticipated in accordance with an SLA.

Workloads layer 6090 provides examples of functionality for which the cloud computing environment may be utilized. Examples of workloads and functions which may be provided from this layer include: mapping and navigation 6091; software development and lifecycle management 6092; virtual classroom education delivery 6093; data analytics processing 6094; transaction processing 6095; and conversion processing of one or more aspects of the present invention 6096.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for executing machine instructions in a computing environment, the computer program product including a non-transitory storage medium readable by a processing circuit and storing instructions for execution by the processing circuit for performing a method, the method comprising:

obtaining, by a processor, a machine instruction to perform a set Boolean operation, the machine instruction comprising a first opcode field and a second opcode filed indicating the set Boolean operation, and the machine instruction having a result field designating a result location to be used for the set Boolean operation, a plurality of condition sources, including a first condition source and a second condition source, and an operation select field configured to specify any one logical operation of a plurality of selectable logical operations which may be specified and performed on the plurality of condition sources by executing the machine instruction, the plurality of selectable logical operations including a first logical operation and a second logical operation, where the first and second logical operations are unrelated logical operations; and executing, by the processor, the machine instruction, the executing comprising, in a single pass through the processor:

obtaining the first condition source and the second condition source;

obtaining from the operation select field a specified operation to be performed on the first condition source and the second condition source, the specified operation being one operation of the plurality of selectable logical operations for which the operation select field is configured;

performing the specified operation on the first condition source and the second condition source to obtain a result, the result being a Boolean result represented as one data type;

based on obtaining the result in the one data type, quantizing the result in the one data type to a value of a selected data type different from the one data type, wherein quantizing the result comprises setting the value to a first selected value of the selected data type based on the result of performing the selected operation comprising one value, and setting the value to a second selected value of the selected data type based on the result of performing the operation comprising another value;

placing the value in the result location, wherein the machine instruction, as a single architected machine instruction having an architected operation code to specify the set Boolean operation, performs the selected operation on multiple condition sources to obtain the result of the one data type, quantizes the result of the one data type and provides the value of the selected data type in the single pass through the processor;

wherein:

the machine instruction comprises a first source field to be used to obtain the first condition source and a second source field to be used to obtain the second condition source, the first source field being used to specify a component in a first selected field of a condition register, and the second source field being used to specify a component in a second selected field of the condition register, the first selected field of the condition register and the second selected field of the condition register each comprising a plurality of condition code components; and each component comprises a bit, the first source field comprises a first value and the second source field comprises a second value, and wherein the obtaining the first condition source comprises adding a first constant to the first value to locate the bit of the first selected field of the condition register to obtain the first condition source, and the obtaining the second condition source comprises adding a second constant to the second value to locate the bit of the second selected field of the condition register to obtain the second condition source, wherein the first constant and the second constant may be the same constant or different constants.

2. The computer program product of claim 1, wherein the first field of the condition register and the second field of the condition register are the same field or different fields.

3. The computer program product of claim 1, wherein the selected data type is one of integer, floating point, decimal floating point, or binary coded decimal.

4. The computer program product of claim 1, wherein the placing the value in the result location comprises storing the value in a register specified by the result field of the machine instruction, wherein the register corresponds to the selected data type.

5. The computer program product of claim 1, wherein the plurality of selectable logical operations comprises multiple unrelated logical operations selected from the group consisting of: NOT AND, OR with Complement, NOT OR, AND with Complement, and Equivalence logical operations.

6. The computer program product of claim 1, wherein the first condition source is a first result of a first previously executed instruction and the second condition source is a second result of a second previously executed instruction.

7. A computer system for executing machine instructions in a computing environment, the computer system comprising:

a memory; and a processor in communications with the memory, wherein the computer system is configured to perform a method, said method comprising:

obtaining, by a processor, a machine instruction to perform a set Boolean operation, the machine instruction comprising a first opcode field and a second opcode filed indicating the set Boolean operation, and the machine instruction having a result field designating a result location to be used for the set Boolean operation, a plurality of condition sources, including a first condition source and a second condition source, and an operation select field configured to specify any one logical operation of a plurality of selectable logical operations which may be specified and performed on the plurality of condition sources by executing the machine instruction, the plurality of selectable logical operations including a first logical operation and a second logical operation, where the first and second logical operations are unrelated logical operations; and executing, by the processor, the machine instruction, the executing comprising, in a single pass through the processor:

obtaining the first condition source and the second condition source;

obtaining from the operation select field a specified operation to be performed on the first condition source and the second condition source, the specified operation being one operation of the plurality of selectable logical operations for which the operation select field is configured;

performing the specified operation on the first condition source and the second condition source to obtain a result, the result being a Boolean result represented as one data type;

based on obtaining the result in the one data type, quantizing the result in the one data type to a value of a selected data type different from the one data type, wherein quantizing the result comprises setting the value to a first selected value of the selected data type based on the result of performing the selected operation comprising one value, and setting the value to a second selected value of the selected data type based on the result of performing the operation comprising another value;

placing the value in the result location, wherein the machine instruction, as a single architected machine instruction having an architected operation code to specify the set Boolean operation, performs the selected operation on multiple condition sources to obtain the result of the one data type, quantizes the result of the one data type and provides the value of the selected data type in the single pass through the processor;

wherein:
the machine instruction comprises a first source field to be used to obtain the first condition source and a second source field to be used to obtain the second condition source, the first source field being used to specify a component in a first selected field of a condition register, and the second source field being used to specify a component in a second selected field of the condition register, the first selected field of the condition register and the second selected field of the condition register each comprising a plurality of condition code components; and each component comprises a bit, the first source field comprises a first value and the second source field comprises a second value, and wherein the obtaining the first condition source comprises adding a first constant to the first value to locate the bit of the first selected field of the condition register to obtain the first condition source, and the obtaining the second condition source comprises adding a second constant to the second value to locate the bit of the second selected field of the condition register to obtain the second condition source, wherein the first constant and the second constant may be the same constant or different constants.

8. The computer system of claim 7, wherein the plurality of selectable logical operations comprises multiple unrelated logical operations selected from the group consisting of: NOT AND, OR with Complement, NOT OR, AND with Complement, and Equivalence logical operations.

9. The computer system of claim 7, wherein the first condition source is a first result of a first previously executed instruction and the second condition source is a second result of a second previously executed instruction.

* * * * *